United States Patent [19]

Morishita

[11] Patent Number: 4,980,532
[45] Date of Patent: Dec. 25, 1990

[54] MACHINING TIME ESTIMATING DEVICE FOR ELECTRIC DISCHARGE MACHINING OPERATION

[75] Inventor: Junko Morishita, Aichi, Japan

[73] Assignee: Mitsubishi Denki Kabushiki Kaisha, Tokyo, Japan

[21] Appl. No.: 416,637

[22] Filed: Oct. 3, 1989

[30] Foreign Application Priority Data

Oct. 4, 1988 [JP] Japan ................... 63-248999

[51] Int. Cl.$^5$ ................... B23H 1/00; B23H 7/20
[52] U.S. Cl. ................... 219/69.13; 364/474.01; 364/474.04
[58] Field of Search ............. 364/474.01, 474.02, 364/474.04, 474.15, 474.16, 474.17; 219/69.13, 69.11, 69.17, 69.12

[56] References Cited

U.S. PATENT DOCUMENTS 4,559,434 12/1985 Kinoshita .................... 219/69.17

FOREIGN PATENT DOCUMENTS

| | | | |
|---|---|---|---|
| 52-61897 | 5/1977 | Japan | 219/69.12 |
| 62-130130 | 6/1987 | Japan | |
| 62-130131 | 6/1987 | Japan | |
| 62-173142 | 7/1987 | Japan | |
| 193728 | 8/1987 | Japan | 219/69.13 |
| 131205 | 6/1988 | Japan | 364/474.04 |
| 318244 | 12/1988 | Japan | 364/474.01 |

Primary Examiner—Geoffrey S. Evans
Attorney, Agent, or Firm—Sughrue, Mion, Zinn, Macpeak & Seas

[57] ABSTRACT

A machining time estimating device for schedule control in an electric discharge machining operation, which is capable of estimating a machining period of time with high accuracy. With such an estimating device, an ideal machining period of time which has been determined according to machining conditions, is modified (since the actual machining procedure does not conform to the ideal conditions) in view of a variety of machining states and the machining conditions to achieve correction estimation. The machining states data includes data representing an area of a workpiece to be machined, a volume of the workpiece to be machined, a machining solution supplying method, and a configuration of the electrode to be used to machine the workpiece.

4 Claims, 5 Drawing Sheets

MACHINING TIME ESTIMATING DEVICE FOR ELECTRIC DISCHARGE MACHINING OPERATION

BACKGROUND OF THE INVENTION

This invention relates to a machining time estimating device for schedule control in an electric discharge machining operation.

FIG. 1 is an explanatory diagram, partly as a block diagram, showing the arrangement of an electric discharge machining apparatus with a machining time estimating device which has been disclosed, for instance, by Published Unexamined Japanese patent application (OPI) No. 130130/1987. In FIG. 1, reference numeral 1 designates a machining electrode; 2, a workpiece to be machined, which is set on a machining stand 3; 4, a ball screw which is driven by a Z-axis DC servo motor 5 to move the machining electrode up and down; 6 and 7, an X-axis DC servo motor and a Y-axis DC servo motor for moving the machining stand 3 in an X-axis direction and in a Y-axis direction, respectively; 8, a DC source for applying a pulse voltage across the machining electrode 1 and the workpiece 2; 9, a switching transistor; 10, a pulse generator for applying a pulse signal to the switching transistor 9; and 11, a number of resistors forming a resistor switching unit.

Further in FIG. 1, reference numeral 13 designates a logical circuit for supplying control signals to the pulse generator 10 and the resistor switching unit 11; 14, a servo control circuit; 15, a drive circuit for the X-axis servo motor 6, the Y-axis servo motor 7 and the Z-axis servo motor 5; 16, a memory unit; 17, an input unit; and 18, a display unit.

FIG. 2 is a block diagram showing the machining time estimating device provided for the electric discharge machining apparatus shown in FIG. 1. The logical circuit 13 includes a calculating section 19 for calculating an estimated time. The calculating section 19 receives input data through the input unit 17 to be processed therein. The result of the operation in the calculating section 19 is applied to the display unit 18, and a part of the result data is stored in the memory unit 16.

An operation of the device will be described hereinunder. By the use of the input unit 17, data $A_1$ indicating the bottom area of the machining electrode 1, data $A_2$ indicating a machining depth, data $A_3$ indicating an amount of reduction of the electrode, and data $A_4$ indicating a series of machining conditions in steps from a rough-machining operation to a finish-machining operation are applied to the input unit 17.

The data $A_1$ through $A_4$ thus inputted are applied to the calculating section 19 where machining periods of time required for the various machining steps are calculated. The result of the calculation is applied, as data $DT_1$, to the display unit 18 and the memory unit 16.

The conventional machining time estimating device is constructed as described above. Therefore, if the machining speed inherent in the machining conditions is corrected according to the present machining states such as an electrode configuration and machining depth, then a reference value for estimation will be lost, and accordingly it cannot be applied to other machining operations. Hence, the estimating device can calculate only ideal machining times. Furthermore, the inputting of an electrode configuration is to obtain a machining area or value; that is, it is not for the variation in machining characteristic due to the electrode configuration. In addition, in the conventional machining time estimating device, factors in machining environmental conditions such as a jet stream of machining solution are not taken into account at all. Hence, the machining time estimated by the conventional machining time estimating device is low in accuracy.

SUMMARY OF THE INVENTION

Accordingly, an object of the present invention is to eliminate the above-described difficulties accompanying a conventional machining time estimating device. More specifically, an object of the invention is to provide a machining time estimating device in which, with machining conditions such as an electrode configuration, machining solution jetting direction, and machining depth taken into account, a machining time is estimated with high accuracy, whereby, in an electric discharge machining operation, the schedule control is positively achieved.

The foregoing object of this invention has been achieved by the provision of a machining time estimating device for an electric discharge machining apparatus comprising, means for inputting various machining state data concerning a machining period of time required for machining to be estimated, the data including data representing at least one of an area and volume to be machined, a machining state storing section having a plurality of independent memory units which store the machining state data thus inputted separately, means for calculating an ideal machining time from the machining state data and data which have been determined for a variety of machining conditions, a knowledge memory means storing a plurality of methods of modifying, according to the data stored in the machining state storing section, the ideal machining time calculated by the ideal machining time calculating means, and an inference means for combining the data which have been stored in the machining state storing means with a plurality of results obtained by the plurality of modifying methods with respect to the machining states, to obtain an amount of correction for machining time, the inference means operating to estimate a machining period of time based on the ideal machining time and the correction amount.

In the machining time estimating device of the invention, the inference section combines the plurality of machining state data stored in the machining state storing section with a plurality of amounts of correction which are provided according to the plurality of methods stored in the knowledge memory section, to make an intricate machining model optimum, thus permitting a practical estimation of machining time.

The machining state storing section stores a plurality of machining state data, while the knowledge memory section stores a plurality of method of making a machining time optimum according to the machining states independently of the inference of the inference section, whereby machining state data and methods of making a machining time optimum can be added or changed with ease.

BRIEF DESCRIPTION OF THE DRAWINGS

In the accompanying drawings.

DESCRIPTION OF THE PREFERRED EMBODIMENTS

Figure 1:
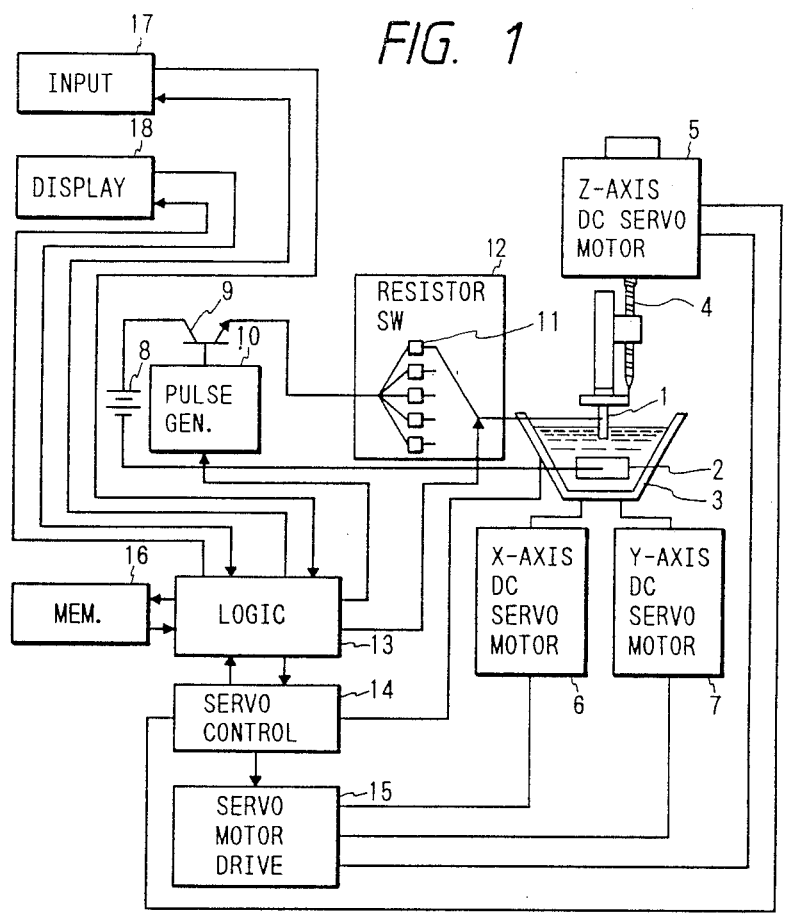
FIG. 1 is an explanatory diagram, partly as a block diagram, showing the arrangement of conventional electric discharge machining apparatus.
Figure 2:
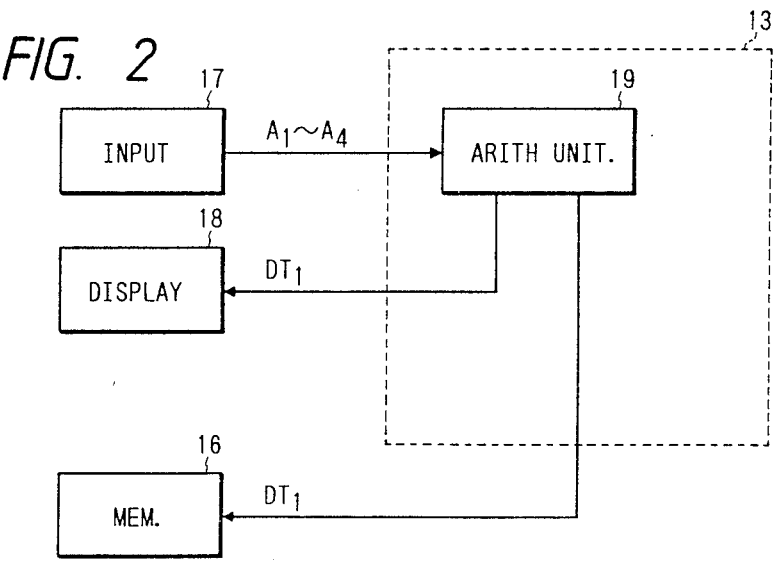
FIG. 2 is a block diagram showing a machining time estimating device for the apparatus shown in FIG. 1.
Figure 3:
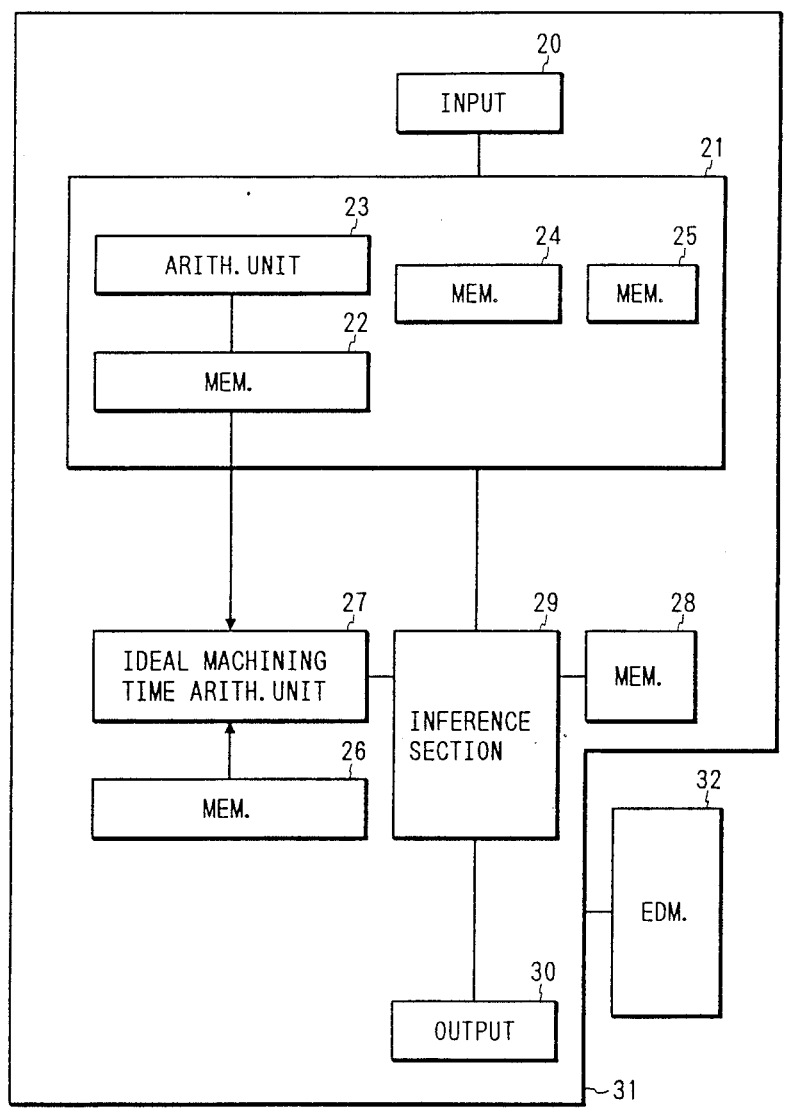
FIG. 3 is a block diagram showing the arrangement of a machining time estimating device which is a first embodiment of this invention.

Preferred embodiments of this invention will be described with reference to the accompanying drawings. FIG. 3 is a block diagram showing a first embodiment of the invention.

In FIG. 3, reference numeral 20 designates an inputting unit for inputting various machining state data such as data on a machining area or volume, machining circumference such as a machining solution jetting method, and electrode configuration; 21, a machining state storing section for storing those machining state data separately according to their kinds, the machining state storing section 21 comprising a machining area/volume storing memory 22, an arithmetic operation unit 23 for calculating machining area/volume, a machining circumference storing memory 24, and an electrode configuration storing memory 25. A memory 26 is provided to store a machining speed, an amount of feed, etc. inherent in machining conditions (hereinafter referred to as "a machining speed and feed storing memory", when applicable) An ideal machining time calculating unit 27 operates to calculate an ideal machining time by using the output data of the machining speed and feed storing memory 26 and the output data of the machining area or volume storing memory. A knowledge memory section 28 is provided to store a plurality of methods of correcting, according to the machining state data stored in the machining state storing section 21, the ideal machining time calculated by the ideal machining time calculating unit 27. An inference section 29 operates to combine the data on a machining circumference and electrode configuration provided by the machining state storing section 21 with a plurality of results which are provided by processing those machining state according to the plurality of methods stored in the knowledge memory section 28 to thereby obtain an amount of correction for a machining time. An ideal machining time is then corrected to an actual machining time taking the thus obtained correction amount into consideration.

Further in FIG. 3, reference numeral 30 designates an outputting unit for outputting the final results provided by the inference section 29; 31, a machining time estimating device comprising the above-described circuit elements 20 through 30; and 32, an electric discharge machine.

Now, the operation of the machining time estimating device thus constructed will be described.

The inputting means 20 is operated to input various machining state data such as data concerning a machining area or volume, a machining circumference such as a machining solution jetting method, and an electrode configuration. The data thus inputted are stored in the memories 22, 24 and 25 in the machining state storing section 21, respectively.

As was described above, the knowledge memory section 28 has stored a plurality of methods of correcting a machining time according to machining states; more specifically, there have been stored a plurality of methods 1, 2, 3 and 4 for determining an amount of correction (or degree of correction) for a machining time as shown in FIG. 4a through 4d. The degree of correction represents a correction rate which is determined with reference to a reference value, that is, an ideal machining speed being made equal to 1.

This will be described in more detail as follows.

The method 1 is to determine a degree of correction for a machining time according to the thickness (the area of a bottom portion of an electrode confronting the workpiece) of an electrode which is one of the factors defining an electrode configuration. This technical concept has never been proposed in the art; that is, heretofore, with respect to the result of an electric discharge machining operation, the degree of correction is determined by the operator's intuition. On the other hand, in the present invention, since a machining time varies depending on the thickness of an electrode, the machining time is extremely prolonged as the thickness thereof increases. Accordingly, the degree of correction for the machining time is divided into a plurality of steps, so that the correction can be accomplished to eliminate a difference with respect to the actual machining time substantially.

Figure 4A:
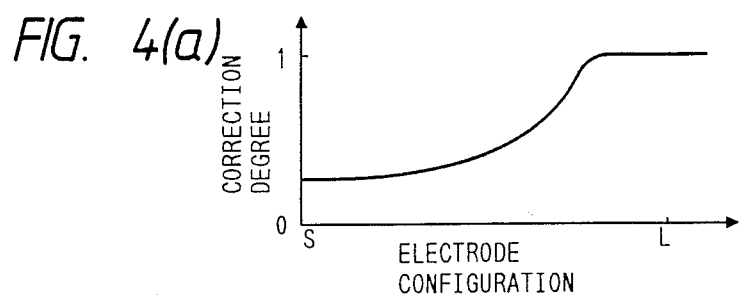
FIGS. 4a through 4d are graphical representations for a description of the contents of a knowledge memory section in which methods of determining a degree of correction for machining time have been stored.
Figure 4B:
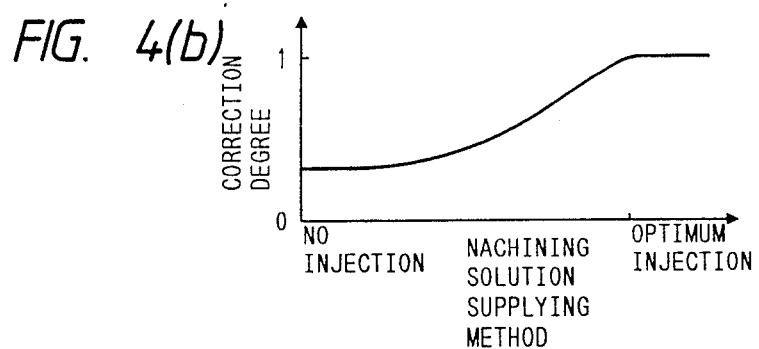

The method 2 is based on the same technical concept. That is, in the method 2, a degree of correction is obtained for variation in a machining time depending on a machining solution jetting method; i.e., a method of supplying a machining solution, as shown in FIG. 4b. In an electric discharge machining operation, the machining solution is jetted, sprayed, or sucked, or those three methods are utilized in combination to supply the machining solution. In the method 2, a degree of correction is determined for a machining time according to the applicability of the machining solution jetting method to the machining operation.

Figure 4C:
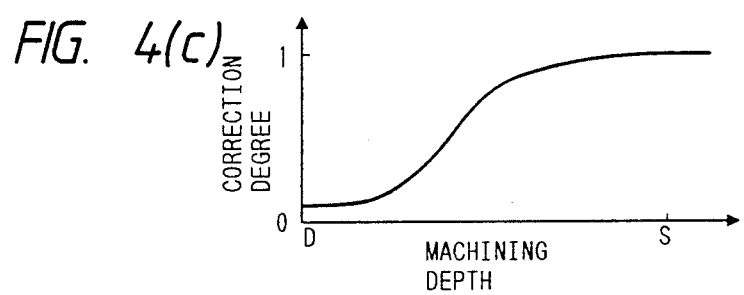

In the method 3, a machining depth is a factor to determine a degree of correction of a machining time as shown FIG. 4c.

Figure 4D:
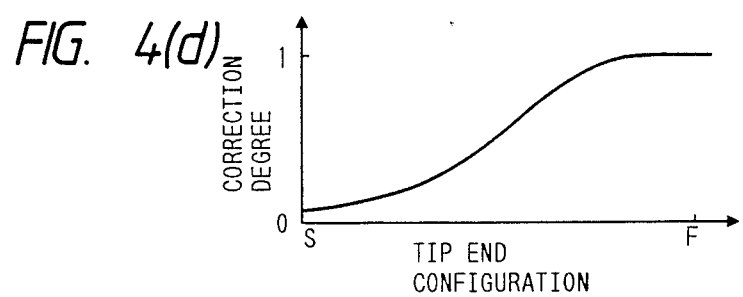

The method 4, as shown in FIG. 4d, is based on an electrode configuration similarly as in the method 1. However, it should be noted that, while the method 1 is based on the configuration of a whole electrode, the method 4 is based on the characteristic configuration of the tip end portion of an electrode.

Figure 5:
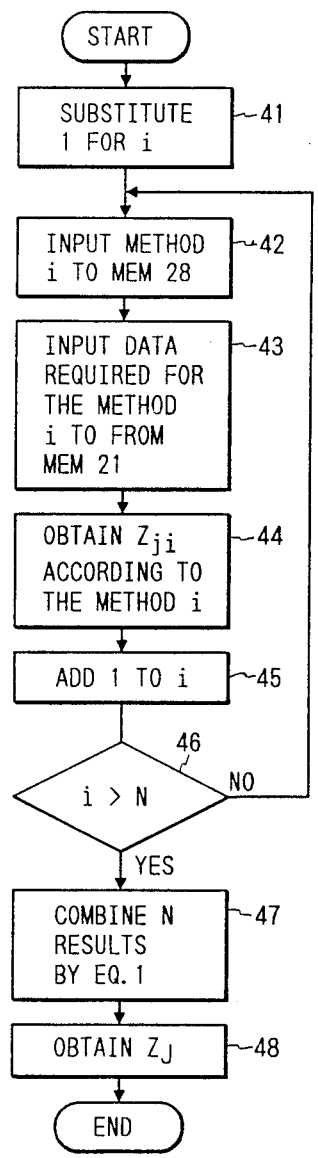
FIG. 5 is a flow chart for processing according to the contents of the knowledge memory section a degree of correction for machining time in each machining step.

Now, a method of correcting the ideal machining time outputted by the ideal machining time calculating unit 27 according to the methods 1 through 4 stored in the knowledge memory section 28 and the machining state data stored in the machining state storing section 21 will be described with reference to a flow chart of FIG. 5. The flow chart is to show a method of correcting a machining time in each machining step in the inference section 29.

First, the inference section 29 substitutes "1" for i in Step 41, to designate and read the method 1 from the knowledge memory section 28 (Step 42). The machining state data which is required according to the method 1, is read out from the machining state storing section 21, that is, data representing the machining area of the electrode is applied from the section 21 to the inference section 29 (Step 43), to obtain a degree of correction $z_{11}$ for a machining time in the first machining step according to the method 1 (Step 44). In Step 45, "1" is added to i, and the next method; i.e., the method 2 is carried out; that is, a degree of correction $z_{12}$ is obtained for a machining time according the machining solution jetting method. Similarly, degrees of correction $z_{13}$ and $z_{14}$ are determined according to the methods 3 and 4, respectively. The above-described operations are carried out until the number of i coincides with "N" which represents the total number of methods to be processed, and in Step 46 it is determined whether or not all of the methods 1 through 4 for instance in this embodiment, have been effected.

In Step 47, the four results provided by the four methods 1 to 4 are combined, to determine a degree of correction $z_j$ for the machining time in the first machining step (Step 48). The combination is achieved by averaging the results according to the following equation (1)*

$$z_j = 1/N \sum_{i=1}^{n} Z_{ji} \quad (1)$$

where N is the total number of methods.

In the methods 1, it is necessary to obtain data on an electrode configuration, and the data which has been stored in the electrode configuration storing memory 25 by the operation of the inputting unit 20, is thus read out therefrom.

In the method 2, it is necessary to obtain data on the applicability of a machining solution jetting method, and similarly the data has been stored in the machining circumference storing memory 24 by the operation of the inputting unit 20 can be used as data on the applicability of the machining solution jetting method.

The method 3 needs data concerning a machining depth. In this case, the machining depth should not be determined only from the numerical value thereof. That is, the machining depth data should include not only an absolute numerical value but a relative value which is obtained taking the size of an electrode into consideration. More specifically, assuming that the same depth is formed with a 0.5 mm square electrode and a 50 cm square electrode, it is determined deep in the machining operation with the former electrode and shallow with the latter electrode. Such data representative of the machining depth has been stored in the machining circumference string memory 24 by the use of the inputting means 20.

Figure 6:
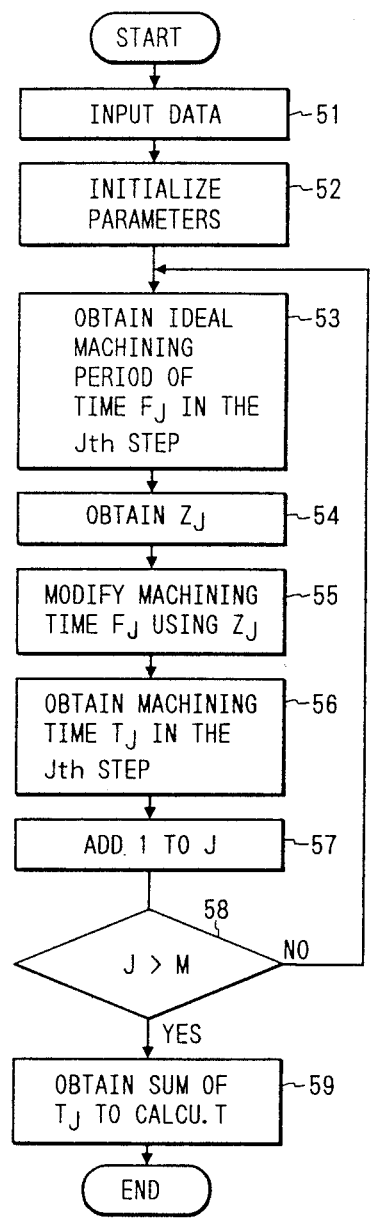
FIG. 6 is also a flow chart for determining a machining time by using the degree of correction obtained in each machining step.

The above-described operations are carried out for each of the machining steps. The degrees of correction for the machining times in the machining steps obtained as described above are utilized to determine a total machining time T according to a flow chart of FIG. 6. This will be described in more detail. In Step 51, the inference section 29 receives data. Then, various parameters are initialized (Step 52). First, an ideal machining time $F_1$ in the first machining step is calculated by the ideal machining time calculating unit 27 (Step 53). Then, the degree of correction $z_1$ for machining time in the first machining step is obtained according to the flow chart of FIG. 7 (Step 54). The degree of correction $z_1$ is used to correct the above-described ideal machining time $F_1$ (Step 55), whereby the total machining time $T_1$ in the first machining step is obtained (Step 56). With "1" added to J, a machining time for the following machining step is obtained (Step 57). The above-described operations are carried out as many times as the total number M of machining steps (Step 58). The machining times $T_j$ obtained for all the machining steps are summed up to obtain the total machining time T (Step 59).

$$T = \sum_{j=1}^{M} T_j$$

where M is the total number of machining steps.

As was described above, the results of analysis with a plurality of machining state data are combined to determine a degree of correction to correct the machining time; that is, with the machining time estimating device, a general determination is made similarly as in the correction of machining time performed by the operator, and therefore an electric discharge machining time can be estimate in correspondence to the present machining operation.

In the above-described embodiment, the four methods based on an electrode thickness, machining solution jetting method, machining depth, and electrode configuration have been stored in the knowledge memory section 28. However, with respect to the electrode configuration, the surface roughness of an electrode, hole configurations, etc. may be inputted as data; and as for the circumference data the degree of contamination of a machining solution may be inputted, for determination of a degree of correction.

If, in the above-described method, parameters affecting a machining time are additionally employed, then the machining time can be determined with higher accuracy.

Furthermore, in the above-described embodiment, Equation (1) is used in order to combine the results provided by the inference section 29. However, the combination of the result may be achieved by various methods such a weighted mean method, maximum value method, and minimum value method.

Figure 7:
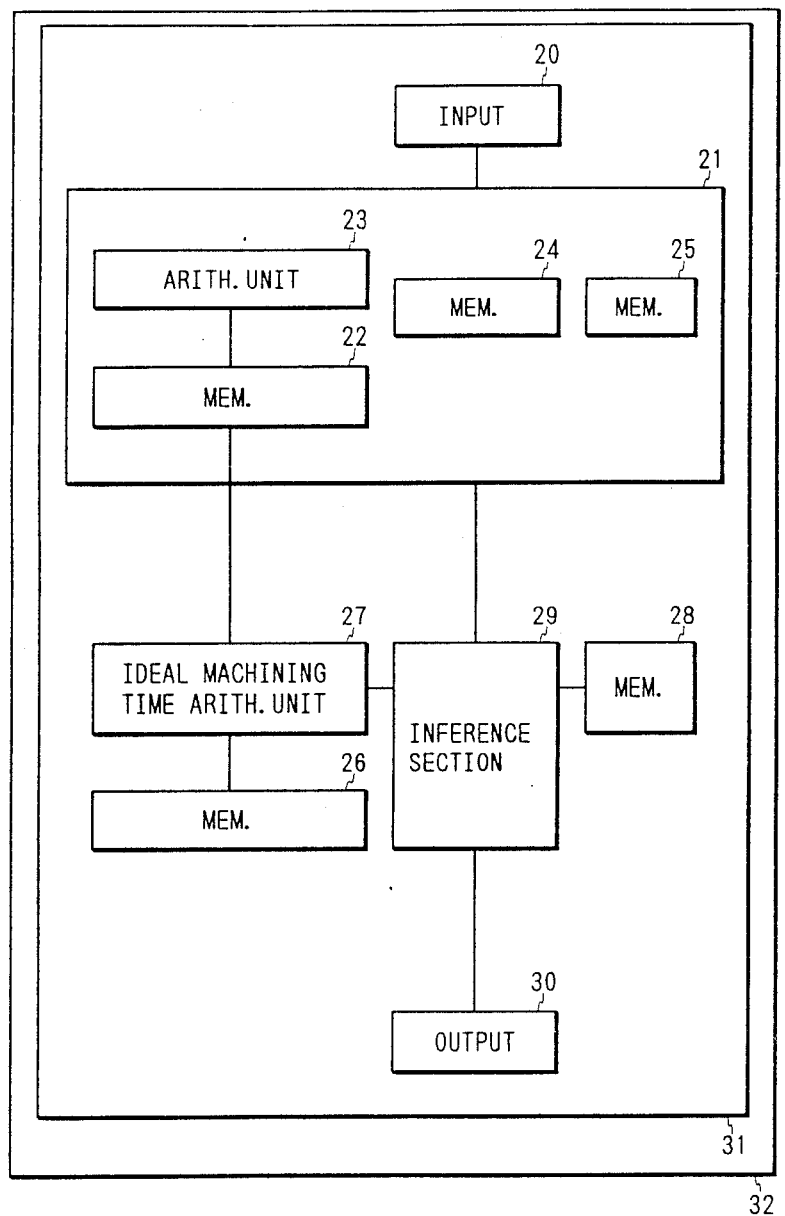
FIG. 7 is a block diagram showing another embodiment of the present invention.

In the above-described embodiment, the machining time estimating device 31 is connected to the electric discharge machine 32; however, it may be built in the electric discharge machine 32 as shown in FIG. 7.

As was described above, in the machining time estimating device according to the invention, various machining state data such as data on a machining solution jetting manner, electrode configuration, and machining depth which are hardly fixed and difficult for a person to determine are separately stored in the machining state storing section, and on the basis of the machining state data thus stored, an ideal machining time is corrected according to the plurality of methods stored in the knowledge memory section, and the resultant machining times are combined by the inference section, to estimate the machining time which is substantially close to the actual machining time. Thus, with the machining time estimating device of the invention, the machining time can be estimated practically, with the result that, in an electric discharge machining operation, the schedule control can be positively achieved. In addition, with the device of the invention, machining state data and correcting methods can be readily added, changed or corrected.

What is claimed is:

1. A machining time estimating device for an electric discharge machining apparatus operable in one or more machining steps comprising:

means for inputting data for a plurality of machining state parameters, each parameter being related to a machining period of time required for machining to be estimated, said data including data representing at least one of an area and volume to be machined;

a machining state storing section having a plurality of independent memory units which store respective ones of said inputted machining state parameter data;

means for calculating an ideal machining time from at least one of said stored machining state parameter data;

a knowledge memory means storing a plurality of methods of modifying, according to respective ones of said parameter data stored in said machining state storing section, the ideal machining time calculated by said ideal machining time calculating means; and an inference means for processing at least one of said parameter data which have been stored in said machining state storing means, in accordance with a respective one of said plurality of modifying method, to obtain an amount of correction for the machining time, said inference means further operating to estimate a machining period of time based on said ideal machining time and said correction amount.

2. A machining time estimating device as defined in claim 1 further comprising means for outputting the estimation result which is obtained by said inference means.

3. A machining time estimating device as defined in claim 1 wherein said machining state data comprises data representing an area of a workpiece to be machined, a volume of said workpiece to be machined, a machining solution supplying method and a configuration of an electrode.

4. A machining time estimating device according to claim 1 wherein said inference means processes said parameter data for each machining step and estimates said machining period of time for each machining step, said interference means further combining the results of said individual step calculations to determine a total estimated machining time.

* * * * *